US012699398B2

(12) United States Patent
Chen et al.

(10) Patent No.: US 12,699,398 B2
(45) Date of Patent: Aug. 4, 2026

(54) ACCURACY MEASUREMENT METHOD OF AUTONOMOUS MOBILE VEHICLE, CALCULATING DEVICE, AND AUTONOMOUS MOBILE VEHICLE

(71) Applicant: Axiomtek Co., Ltd., New Taipei City (TW)

(72) Inventors: Po-Cheng Chen, New Taipei City (TW); Kao-Pin Lin, New Taipei City (TW); Liang-Chin Wang, New Taipei City (TW); Shi-I Wang, New Taipei City (TW)

(73) Assignee: AXIOMTEK CO., LTD., New Taipei City (TW)

( * ) Notice: Subject to any disclaimer, the term of this patent is extended or adjusted under 35 U.S.C. 154(b) by 77 days.

(21) Appl. No.: 18/764,173

(22) Filed: Jul. 4, 2024

(65) Prior Publication Data

US 2026/0010161 A1      Jan. 8, 2026

(30) Foreign Application Priority Data

Feb. 2, 2024    (TW) ................................. 113104086

(51) Int. Cl.
| | |
|---|---|
| *G05D 1/244* | (2024.01) |
| *G05D 1/86* | (2024.01) |
| *G05D 111/10* | (2024.01) |

(52) U.S. Cl.
CPC ............. G05D 1/2446 (2024.01); G05D 1/86 (2024.01); *G05D 2111/10* (2024.01)

(58) Field of Classification Search
CPC ..... G05D 1/2446; G05D 1/86; G05D 2111/10
See application file for complete search history.

(56) References Cited

U.S. PATENT DOCUMENTS

| | | | |
|---|---|---|---|
| 2016/0018224 A1 | 1/2016 | Isler et al. | |
| 2018/0039282 A1* | 2/2018 | Gupta | ................. G05D 1/0274 |

(Continued)

FOREIGN PATENT DOCUMENTS

| | | |
|---|---|---|
| CN | 113029138 A | 6/2021 |
| CN | 113155154 A | 7/2021 |

(Continued)

OTHER PUBLICATIONS

"Paris et al., Dynamic Landing of an Autonomous Quadrotor on a Moving Platform in Turbulent Wind Conditions, Mar. 13, 2020, arXiv: 1909.11071, pp. 1-7" (Year: 2020).*

(Continued)

*Primary Examiner* — Dale W Hilgendorf
*Assistant Examiner* — Frank T Glenn, III
(74) *Attorney, Agent, or Firm* — Li & Cai Intellectual Property Office

(57) ABSTRACT

An accuracy measurement method of an autonomous mobile vehicle, a calculating device, and an autonomous mobile vehicle are provided. The accuracy measurement method includes a distance calculating step, a regression center calculating step, and an average calculating step. The distance calculating step includes a controlling step, a light beam emitting step, an image capturing step, an image analyzing step, and a converting step. The regression center calculating step is performed after the distance calculating step is repeatedly performed for at least two times. The accuracy measurement method is performed to obtain an X-axis offset in an X-axis direction, a Y-axis offset in a Y-axis direction, and an angle deflection of an autonomous mobile vehicle. In the distance calculating step, the AprilTag on the marker is used in conjunction with the light spot on the marker to calculate an X-axis true distance and a Y-axis true distance.

17 Claims, 9 Drawing Sheets

(56) References Cited

U.S. PATENT DOCUMENTS

| | | | | |
|---|---|---|---|---|
| 2019/0329407 A1* | 10/2019 | Qi | .................. | G05D 1/0248 |
| 2021/0124051 A1* | 4/2021 | Lu | .................. | G01S 17/88 |
| 2023/0399015 A1* | 12/2023 | Kothari | .................. | G06V 10/14 |

FOREIGN PATENT DOCUMENTS

| | | | | |
|---|---|---|---|---|
| JP | 201912063 A | 1/2019 | | |
| TW | 201830546 A | 8/2018 | | |
| TW | M642252 U | * 6/2023 | ............. | G05D 1/244 |

OTHER PUBLICATIONS

"Kallwies et al., Determining and Improving the Localization Accuracy of AprilTag Detection, 2020, IEEE International Conference on Robotics and Automation (ICRA), pp. 8288-8294" (Year: 2020).*

Daniel Becker, et al., "Cost-effective camera based ground truth for indoor localization", 2015 IEEE International Conference on Advanced Intelligent Mechatronics, IEEE, Jul. 7, 2015. p. 885-890.

Harsha Kikkeri, et al., "An Inexpensive Method for Evaluating the Localization Performance of a Mobile Robot Navigation System", 2014 IEEE International Conference on Robotics & Automation, IEEE, May 31, 2014, p. 4100-4107.

Simone Ceriani, et al., "Rawseeds ground truth collection systems for indoor self-localization and mapping", Autonomous Robots, Kluwer Academic Publishers, BO, vol. 27, No. 4, Sep. 22, 2009, pp. 353-371.

* cited by examiner

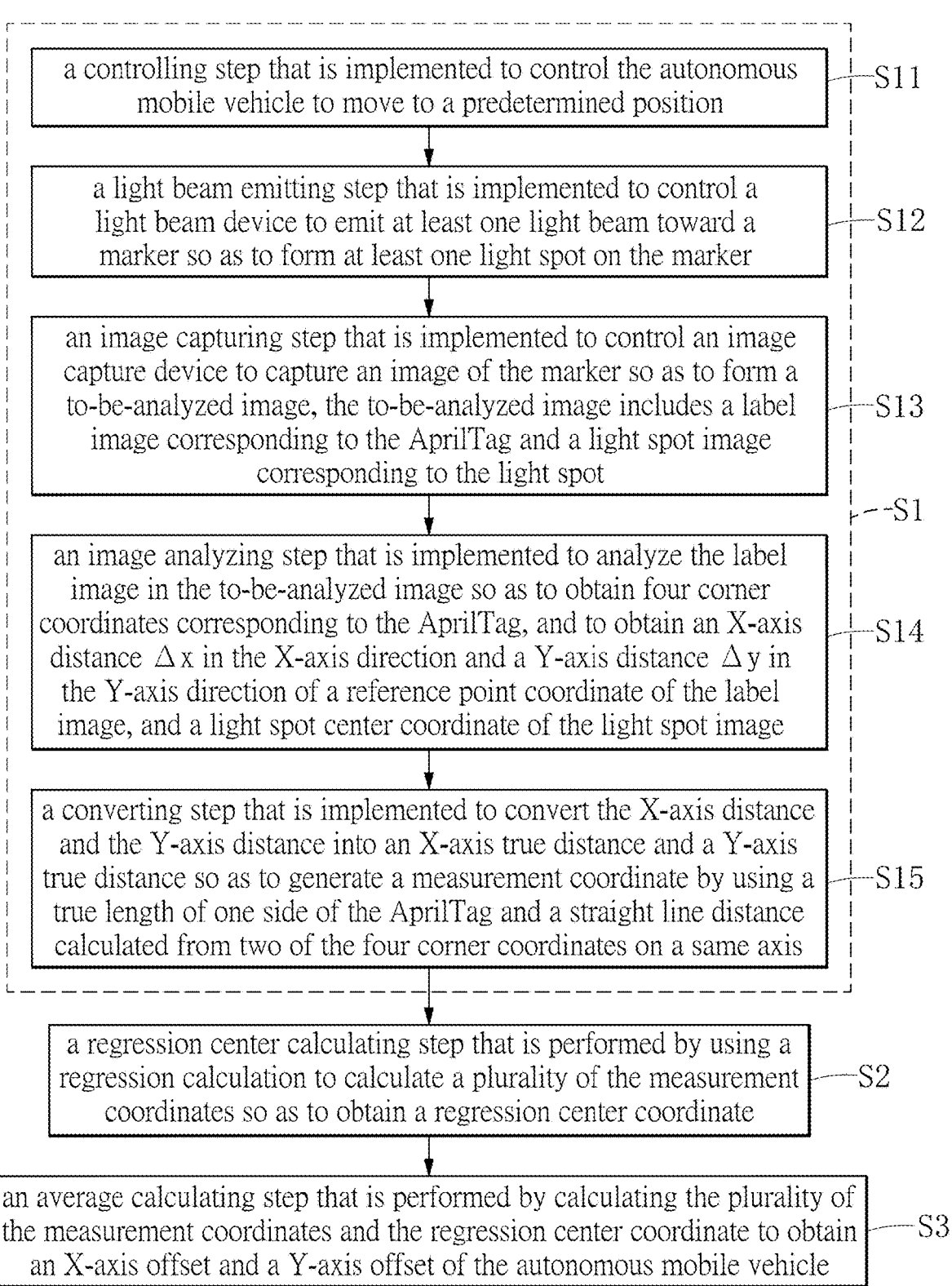

a controlling step that is implemented to control the autonomous mobile vehicle to move to a predetermined position — S11 a light beam emitting step that is implemented to control a light beam device to emit at least one light beam toward a marker so as to form at least one light spot on the marker — S12 an image capturing step that is implemented to control an image capture device to capture an image of the marker so as to form a to-be-analyzed image, the to-be-analyzed image includes a label image corresponding to the AprilTag and a light spot image corresponding to the light spot — S13

— S1 an image analyzing step that is implemented to analyze the label image in the to-be-analyzed image so as to obtain four corner coordinates corresponding to the AprilTag, and to obtain an X-axis distance $\Delta x$ in the X-axis direction and a Y-axis distance $\Delta y$ in the Y-axis direction of a reference point coordinate of the label image, and a light spot center coordinate of the light spot image — S14 a converting step that is implemented to convert the X-axis distance and the Y-axis distance into an X-axis true distance and a Y-axis true distance so as to generate a measurement coordinate by using a true length of one side of the AprilTag and a straight line distance calculated from two of the four corner coordinates on a same axis — S15 a regression center calculating step that is performed by using a regression calculation to calculate a plurality of the measurement coordinates so as to obtain a regression center coordinate — S2 an average calculating step that is performed by calculating the plurality of the measurement coordinates and the regression center coordinate to obtain an X-axis offset and a Y-axis offset of the autonomous mobile vehicle — S3

FIG. 2

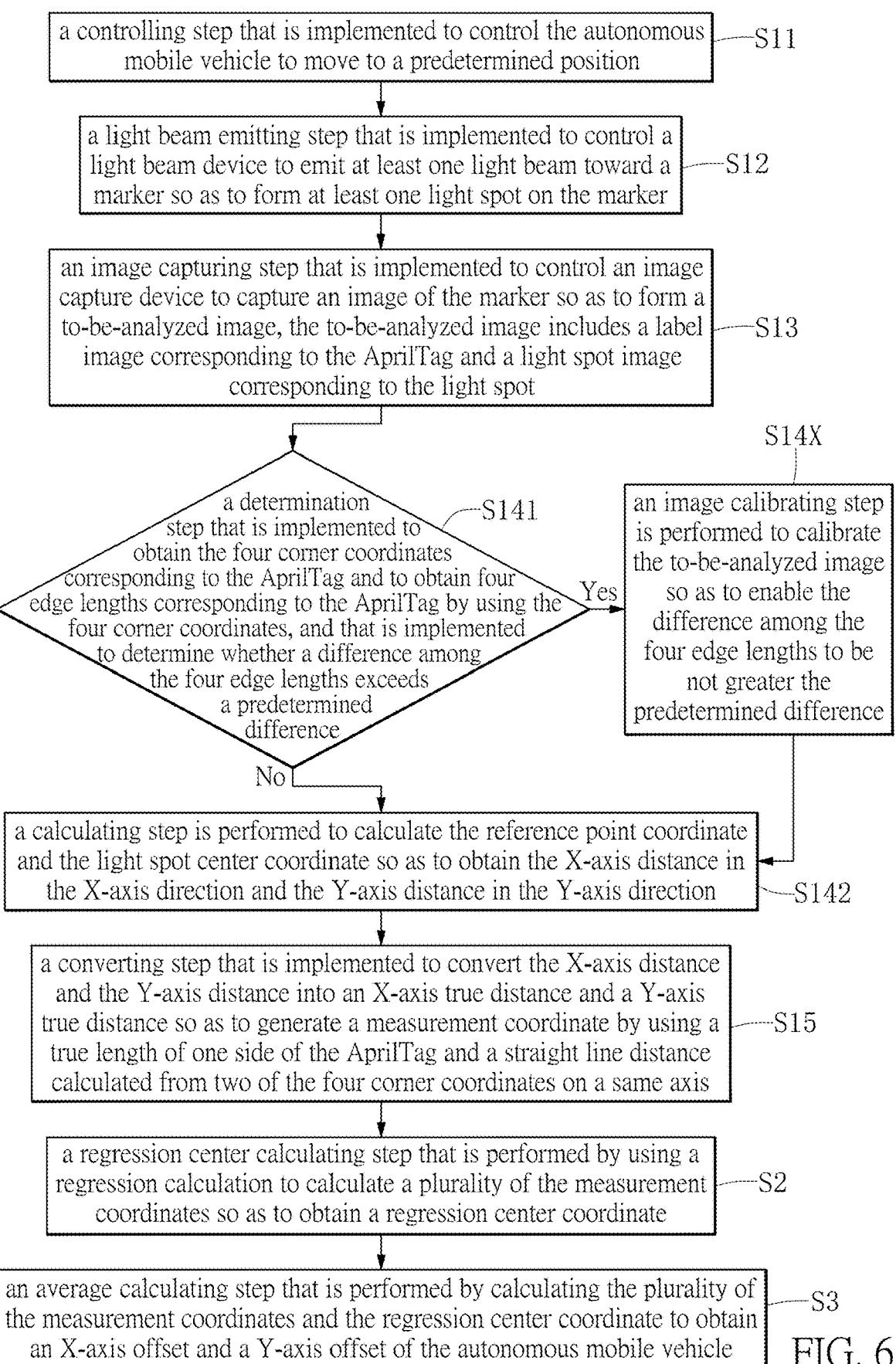

a controlling step that is implemented to control the autonomous mobile vehicle to move to a predetermined position ——S11 a light beam emitting step that is implemented to control a light beam device to emit at least one light beam toward a marker so as to form at least one light spot on the marker ——S12 an image capturing step that is implemented to control an image capture device to capture an image of the marker so as to form a to-be-analyzed image, the to-be-analyzed image includes a label image corresponding to the AprilTag and a light spot image corresponding to the light spot ——S13

S14X a determination step that is implemented to obtain the four corner coordinates corresponding to the AprilTag and to obtain four edge lengths corresponding to the AprilTag by using the four corner coordinates, and that is implemented to determine whether a difference among the four edge lengths exceeds a predetermined difference ——S141

Yes an image calibrating step is performed to calibrate the to-be-analyzed image so as to enable the difference among the four edge lengths to be not greater the predetermined difference No a calculating step is performed to calculate the reference point coordinate and the light spot center coordinate so as to obtain the X-axis distance in the X-axis direction and the Y-axis distance in the Y-axis direction ——S142 a converting step that is implemented to convert the X-axis distance and the Y-axis distance into an X-axis true distance and a Y-axis true distance so as to generate a measurement coordinate by using a true length of one side of the AprilTag and a straight line distance calculated from two of the four corner coordinates on a same axis ——S15 a regression center calculating step that is performed by using a regression calculation to calculate a plurality of the measurement coordinates so as to obtain a regression center coordinate ——S2 an average calculating step that is performed by calculating the plurality of the measurement coordinates and the regression center coordinate to obtain an X-axis offset and a Y-axis offset of the autonomous mobile vehicle ——S3

FIG. 6

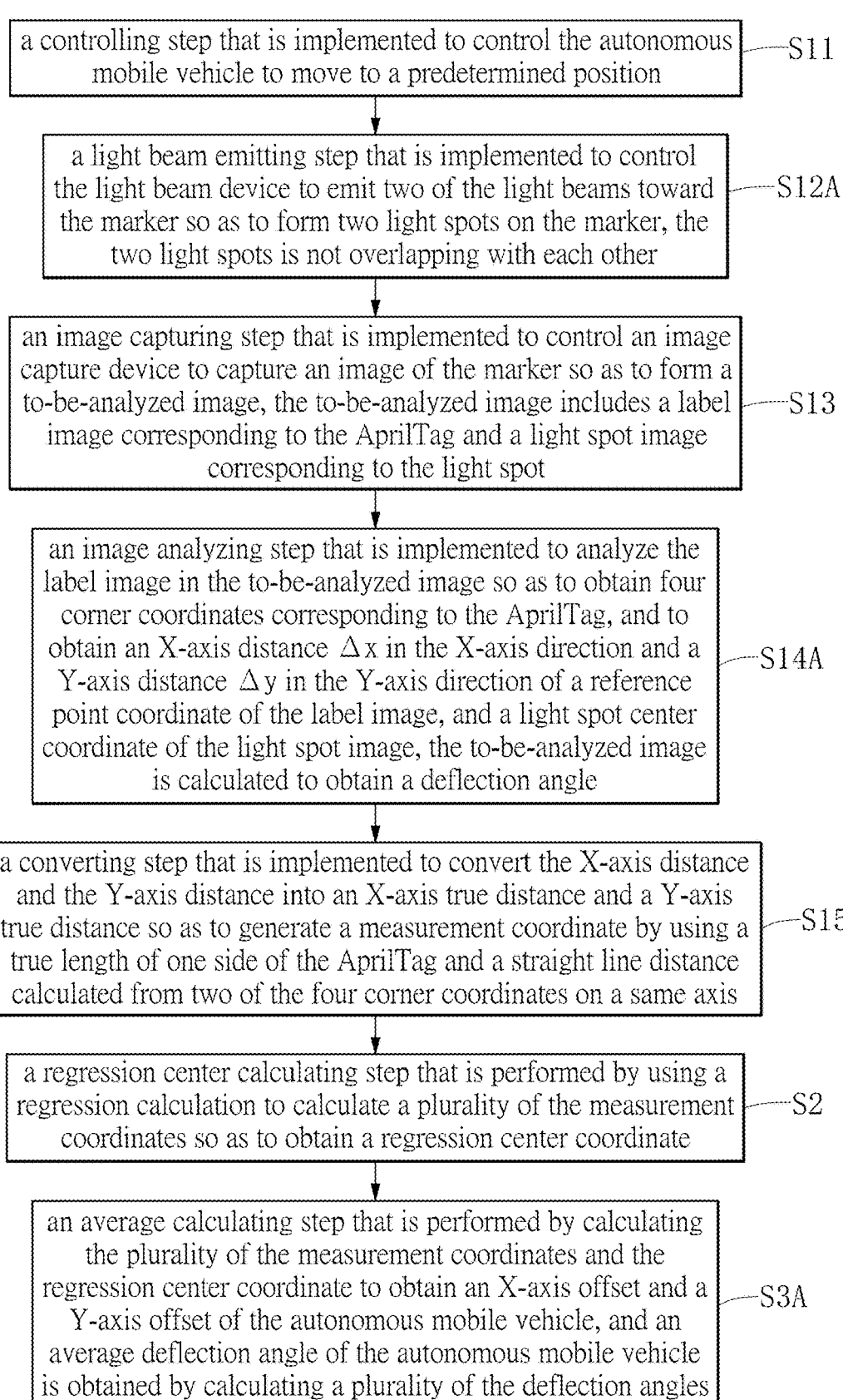

a controlling step that is implemented to control the autonomous mobile vehicle to move to a predetermined position ——S11 a light beam emitting step that is implemented to control the light beam device to emit two of the light beams toward the marker so as to form two light spots on the marker, the two light spots is not overlapping with each other ——S12A an image capturing step that is implemented to control an image capture device to capture an image of the marker so as to form a to-be-analyzed image, the to-be-analyzed image includes a label image corresponding to the AprilTag and a light spot image corresponding to the light spot ——S13 an image analyzing step that is implemented to analyze the label image in the to-be-analyzed image so as to obtain four corner coordinates corresponding to the AprilTag, and to obtain an X-axis distance $\Delta$x in the X-axis direction and a Y-axis distance $\Delta$y in the Y-axis direction of a reference point coordinate of the label image, and a light spot center coordinate of the light spot image, the to-be-analyzed image is calculated to obtain a deflection angle ——S14A a converting step that is implemented to convert the X-axis distance and the Y-axis distance into an X-axis true distance and a Y-axis true distance so as to generate a measurement coordinate by using a true length of one side of the AprilTag and a straight line distance calculated from two of the four corner coordinates on a same axis ——S15 a regression center calculating step that is performed by using a regression calculation to calculate a plurality of the measurement coordinates so as to obtain a regression center coordinate ——S2 an average calculating step that is performed by calculating the plurality of the measurement coordinates and the regression center coordinate to obtain an X-axis offset and a Y-axis offset of the autonomous mobile vehicle, and an average deflection angle of the autonomous mobile vehicle is obtained by calculating a plurality of the deflection angles ——S3A

FIG. 7

ACCURACY MEASUREMENT METHOD OF AUTONOMOUS MOBILE VEHICLE, CALCULATING DEVICE, AND AUTONOMOUS MOBILE VEHICLE

FIELD OF THE DISCLOSURE

The present disclosure relates to an accuracy measurement method, a calculating device capable of performing the same, and a vehicle capable of performing the same, and more particularly to an accuracy measurement method of an autonomous mobile vehicle, a calculating device, and an autonomous mobile vehicle that includes the calculating device.

BACKGROUND OF THE DISCLOSURE

In the existing art, technology that is capable of measuring movement accuracy for autonomous mobile vehicles has yet to be developed, such as an autonomous mobile robot (AMR) or an automated guided vehicle (AGV) from various different factories. Specifically, after a user purchases the AMR or the AGV, a movement accuracy of the autonomous mobile vehicle (i.e., the AMR or the AGV) can only be obtained from manuals or specifications provided by the manufacturer, so that a true movement accuracy of the autonomous mobile vehicle cannot be verified.

SUMMARY OF THE DISCLOSURE

In response to the above-referenced technical inadequacy, the present disclosure provides an accuracy measurement method of an autonomous mobile vehicle, a calculating device, and an autonomous mobile vehicle to effectively improve on the issues associated with the lack of concrete means for measuring movement accuracy of conventional autonomous mobile vehicles.

In order to solve the above-mentioned problems, one of the technical aspects adopted by the present disclosure is to provide an accuracy measurement method for being performed through a calculating device to measure an X-axis offset and a Y-axis offset of an autonomous mobile vehicle respectively along an X-axis direction and a Y-axis direction. The accuracy measurement method includes a distance calculating step, a regression center calculating step, and an average calculating step. The distance calculating step is repeatedly performed for a predetermined number of times that is greater than or equal to two times. The distance calculating step includes a controlling step, a light beam emitting step, an image capturing step, an image analyzing step, and a converting step. The controlling step is implemented to control the autonomous mobile vehicle to move to a predetermined position. The light beam emitting step is implemented to control a light beam device to emit at least one light beam toward a marker so as to form at least one light spot on the marker. The marker has an AprilTag or an ArUco tag, and in the light beam emitting step, the light spot is away from the AprilTag or the ArUco tag. The light beam device is disposed on one of the autonomous mobile vehicle and a periphery of the predetermined position, and the marker is disposed on another one of the autonomous mobile vehicle and the periphery of the predetermined position. The image capturing step is implemented to control an image capture device to capture an image of the marker so as to form a to-be-analyzed image. The to-be-analyzed image includes a label image corresponding to the AprilTag or the ArUco tag and a light spot image corresponding to the light spot. The image analyzing step is implemented to analyze the label image in the to-be-analyzed image so as to obtain four corner coordinates corresponding to the AprilTag or the ArUco tag, and to obtain an X-axis distance in the X-axis direction and a Y-axis distance in the Y-axis direction of a reference point coordinate of the label image, and a light spot center coordinate of the light spot image. The reference point coordinate is one of the four corner coordinates or the reference point coordinate is a label central point coordinate of the label image that is calculated from the four corner coordinates. The converting step is implemented to convert the X-axis distance and the Y-axis distance into an X-axis true distance and a Y-axis true distance so as to generate a measurement coordinate by using a true length of one side of the AprilTag or the ArUco tag and a straight line distance calculated from two of the four corner coordinates on a same axis. The measurement coordinate includes the X-axis true distance and the Y-axis true distance. The regression center calculating step is performed by using a regression calculation to calculate a plurality of the measurement coordinates so as to obtain a regression center coordinate. The average calculating step is performed by calculating the plurality of the measurement coordinates and the regression center coordinate to obtain the X-axis offset and the Y-axis offset of the autonomous mobile vehicle. The regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

In order to solve the above-mentioned problems, another one of the technical aspects adopted by the present disclosure is to provide a calculating device for being assembled to an autonomous mobile vehicle and for performing the accuracy measurement method. The calculating device is configured to be electrically coupled to a processing device of the autonomous mobile vehicle, the processing device is configured to control the autonomous mobile vehicle to move to the predetermined position, the calculating device is configured to be electrically coupled to the image capture device for controlling a movement of the image capture device and receiving the to-be-analyzed image emitted from the image capture device.

In order to solve the above-mentioned problems, yet another one of the technical aspects adopted by the present disclosure is to provide an autonomous mobile vehicle, which includes the calculating device, the processing device, a detecting device, and a driving device. The detecting device is configured to detect a surrounding environment of the autonomous mobile vehicle to generate a detection information. The detecting device is configured to transmit the detection information to the processing device. The driving device is electrically connected to the processing device. The processing device is configured to control the driving device to be operated according to the detection information, so that the autonomous mobile vehicle is moved to the predetermined position.

Therefore, any one of the accuracy measurement method, the calculating device, and the autonomous mobile vehicle of the present disclosure can be provided to measure the X-axis offset in the X-axis direction and the Y-axis offset in the Y-axis direction of the autonomous mobile vehicle, so that the relevant personnel can observe the accuracy of the autonomous mobile vehicle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 2 is a flowchart of an accuracy measurement method of the autonomous mobile vehicle according to a first embodiment of the present disclosure;

FIG. 6 is a flowchart of the accuracy measurement method of the autonomous mobile vehicle according to a second embodiment of the present disclosure;

FIG. 7 is a flowchart of the accuracy measurement method of the autonomous mobile vehicle according to a third embodiment of the present disclosure;

DETAILED DESCRIPTION OF THE EXEMPLARY EMBODIMENTS

Figure 1:
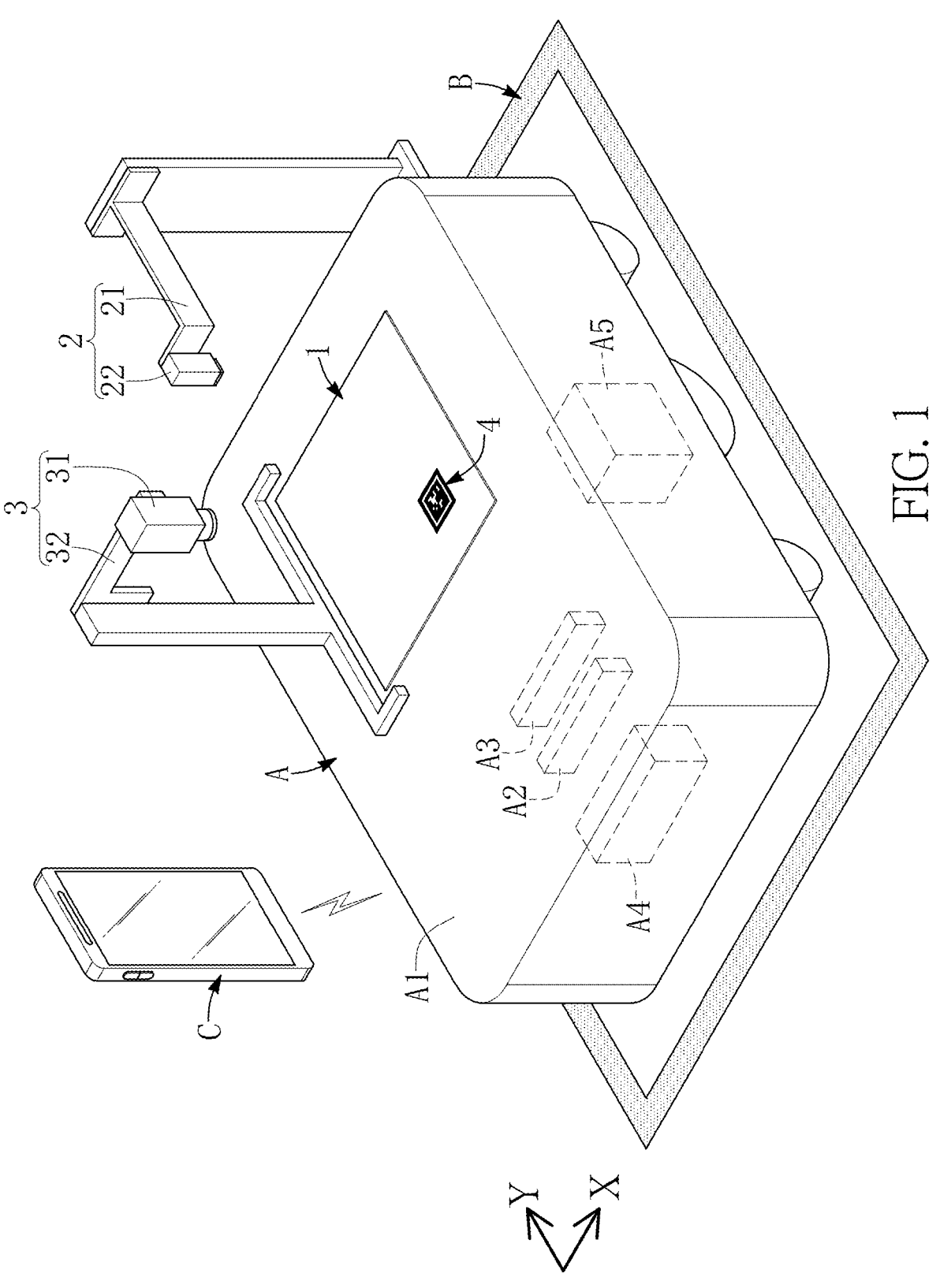
FIG. 1 is a schematic perspective view of an autonomous mobile vehicle according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a perspective view of an autonomous mobile vehicle according to the present disclosure. The autonomous mobile vehicle A of the present disclosure includes a marker 1, a vehicle body A1, a calculating device A2 (or a computing device A2), a processing device A3, a detecting device A4, and a driving device A5 that is disposed in the vehicle body A1. The calculating device A2 is provided to perform an accuracy measurement method of an autonomous mobile vehicle of the present disclosure, and the calculating device A2 is electrically connected to the processing device A3. The calculating device A2 can be any kind of industrial computer or a computer device having any kind of processing chip, but the present disclosure is not limited thereto. The autonomous mobile vehicle A of the present disclosure can be applied to a vehicle having an autonomous path planning function, such as: an autonomous mobile robot (AMR), an automated guided vehicle (AGV), a robot vacuum cleaner, or a self-driving car.

The detecting device A4 is configured to detect a surrounding environment of the autonomous mobile vehicle A to generate a detection information, and the detecting device A4 is configured to transmit the detection information to the processing device A3. The driving device A5 is electrically connected to the processing device A3. The processing device A3 is configured to control the driving device A5 to be operated according to the detection information, so that the autonomous mobile vehicle A is moved to a predetermined position. In order to clearly show the present disclosure, the drawings of the present embodiment use a marking circle B to show the predetermined position. The specific operation of any one of the processing device A3, the detecting device A4, and the driving device A5 is identical to that of a conventional AMR, and is not described herein for the sake of brevity.

When the autonomous mobile vehicle A is measured accurately, the light beam device 2 can be disposed on a periphery of the predetermined position by the relevant personnel, the image capture device 3 is disposed on an upper surface of the autonomous mobile vehicle A, and the upper surface of the autonomous mobile vehicle A is provided with the marker 1 thereon. The light beam device 2 can include a supporting frame 21 and a light beam generator 22 that is disposed on the periphery of the predetermined position through the supporting frame 21. The image capture device 3 can include a supporting frame 32 and an image capture member 31 that is disposed on autonomous mobile vehicle A through the supporting frame 32.

The calculating device A2 can be electrically coupled to the image capture device 3 in a wire connection or a wireless connection. The calculating device A2 is configured to control the image capture device 3 to capture an image of the marker 1 disposed on the autonomous mobile vehicle A, and is configured to receive a to-be-analyzed image 33 transmitted from the image capture device 3. In other embodiments of the present disclosure, the calculating device A2 can control the light beam device 2 to be opened or closed.

Furthermore, in other embodiments of the present disclosure, the calculating device A2 can be independently sold, operated, or manufactured, and the calculating device A2 is not limited to being sold or manufactured with the autonomous mobile vehicle A. In one embodiment of the present disclosure (e.g., where the calculating device A2 is independently sold), after the calculating device A2 is purchased, the calculating device A2 can be separately assembled to an autonomous mobile vehicle (e.g., an AMR or an AGV) and is connected to the processing device A3 of the autonomous mobile vehicle.

In one embodiment of the present disclosure (e.g., where the calculating device A2 is independently sold), the calculating device A2 can be a remote server or a cloud server in a factory. Moreover, in one embodiment of the present disclosure (e.g., where the calculating device A2 is independently sold), the calculating device A2 can be assembled in a housing with the light beam device 2 or the image capture device 3.

Figure 3:
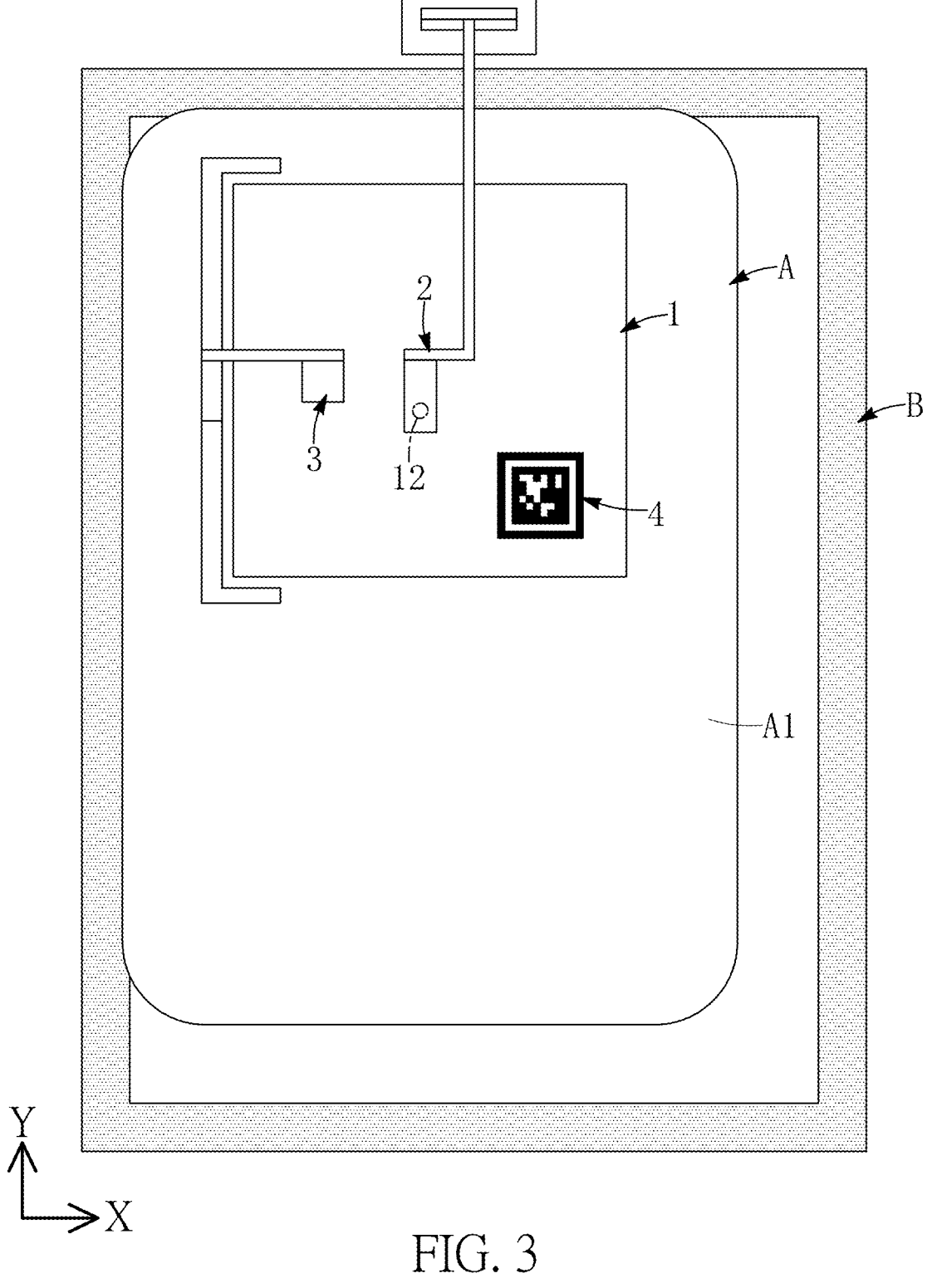
FIG. 3 is a top view showing the autonomous mobile vehicle moved to a predetermined position according to the present disclosure.
Figure 4:
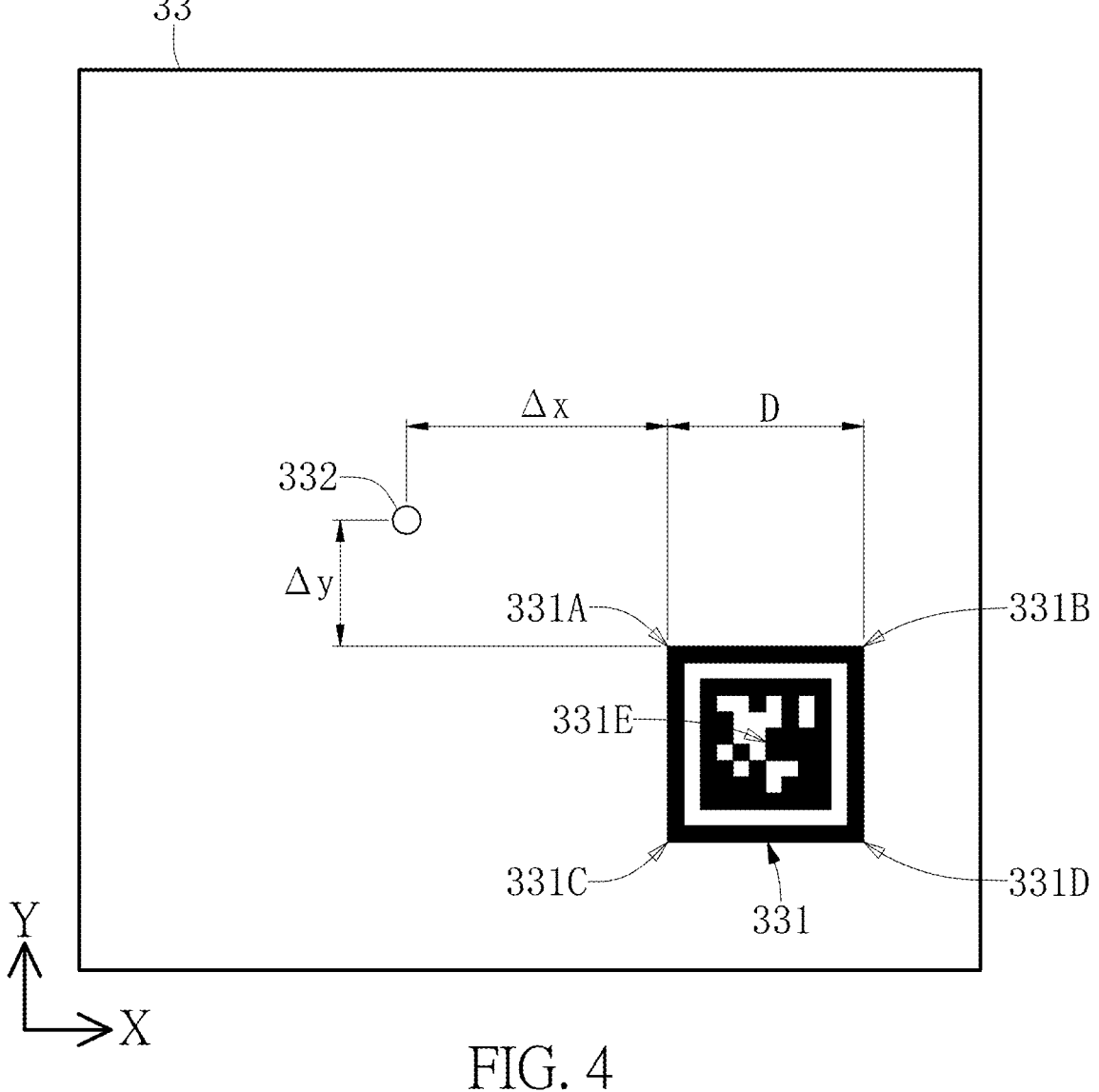
FIG. 4 is a schematic view showing a to-be-analyzed image of the accuracy measurement method according to the first embodiment of the present disclosure.

As shown in FIG. 1 to FIG. 4, FIG. 2 is a flowchart of the accuracy measurement method of the autonomous mobile vehicle according to the present disclosure, FIG. 3 is a top view showing the autonomous mobile vehicle moved to the predetermined position according to the present disclosure, and FIG. 4 is a schematic view showing the to-be-analyzed image of the accuracy measurement method according to the first embodiment of the present disclosure.

The accuracy measurement method of the autonomous mobile vehicle in the present disclosure is provided to measure an X-axis offset and a Y-axis offset of an autonomous mobile vehicle A respectively along an X-axis direction and a Y-axis direction. The accuracy measurement method of the autonomous mobile vehicle is described as follows.

The accuracy measurement method is implemented by repeatedly performing a distance calculating step S1 for a predetermined number of times, and then performing a regression center calculating step S2 and an average calculating step S3. The distance calculating step S1 includes a controlling step S11, a light beam emitting step S12, an image capturing step S13, an image analyzing step S14, and a converting step S15.

The controlling step S11 is implemented to control the autonomous mobile vehicle A to move to the predetermined position (e.g., marked by the marking circle B shown in FIG. 3).

The light beam emitting step S12 is implemented to control the light beam device 2 to emit at least one light beam toward the marker 1 so as to form at least one light spot 12 on the marker 1. The marker 1 has an AprilTag 4, and in the light beam emitting step S12, the light spot 12 is away from the AprilTag 4.

The image capturing step S13 is implemented to control the image capture device 3 to capture an image of the marker 1 so as to form the to-be-analyzed image 33. The to-be-analyzed image 33 includes a label image 331 corresponding to the AprilTag 4 and a light spot image 332 corresponding to the light spot 12.

The image analyzing step S14 is implemented to analyze the label image 331 in the to-be-analyzed image 33 so as to obtain four corner coordinates corresponding to the AprilTag 4, and to obtain an X-axis distance $\Delta x$ in the X-axis direction and a Y-axis distance $\Delta y$ in the Y-axis direction of a reference point coordinate of the label image 331 and a light spot center coordinate of the light spot image 332.

As shown in FIG. 4, a corner point 331A located at an upper left side of the label image 331 is defined as a reference point, but the reference point of the present disclosure is not limited thereto. The reference point coordinate is one of the four corner coordinates corresponding to the four corner points 331A, 331B, 331C, 331D of the label image 331, or the reference point coordinate is a label central point coordinate of the label image 331 that is calculated from the four corner coordinates (e.g., a coordinate corresponding to a label central point 331E shown in FIG. 4).

The converting step S15 is implemented to convert the X-axis distance $\Delta x$ and the Y-axis distance $\Delta y$ into an X-axis true distance and a Y-axis true distance so as to generate a measurement coordinate by using a true length of one side of the AprilTag 4 and a straight line distance D calculated from two of the four corner coordinates on a same axis. The measurement coordinate includes the X-axis true distance and the Y-axis true distance. That is to say, the measurement coordinate is: $(\Delta x, \Delta y)$.

In addition, the straight line distance D is calculated from the corner point 331A and the corner point 331B shown in FIG. 4, but the present disclosure is not limited thereto. In other embodiments of the present disclosure, the straight line distance D can be calculated from the corner point 331A and the corner point 331C, or the corner point 331B and the corner point 331D, or the corner point 331C and the corner point 331D. In the converting step S15, the true length of the AprilTag 4 can be pre-stored in the calculating device A2 or the processing device A3, and the X-axis distance $\Delta x$ and the Y-axis distance $\Delta y$ are converted so as to obtain the X-axis true distance and the Y-axis true distance by using the straight line distance D in the to-be analyzed image 33 and a true length corresponding to the straight line distance D.

It should be noted that, the image analyzing step S14 and the converting step S15 are mainly implemented to convert the X-axis distance $\Delta x$ and the Y-axis distance $\Delta y$ into the X-axis true distance and the Y-axis true distance respectively. Therefore, after the relevant personnel considers a content of the converting step S15, the relevant personnel can easily think of taking a length of any two points of the AprilTag 4 (e.g., a straight-line distance from a center point of the AprilTag 4 to one of the corners) as the true length, and the true length corresponding to the length in the to-be analyzed image can be calculated by using the four corner coordinates.

In a practical application, any kind of factors of the to-be-analyzed image 33 (e.g., a placing position of the image capture device 3 with respect to the marker 1 or a magnification of the image capture device 3 capturing the marker 1) may result in an issue where the image length D of the to-be-analyzed image 33 is different from the true length. Accordingly, the converting step S15 is provided to effectively improve on or solve this issue after the image analyzing step S14 is performed, thereby obtaining the X-axis true distance and the Y-axis true distance which are close to real-world conditions.

The regression center calculating step S2 is performed by using a regression calculation to calculate a plurality of the measurement coordinates so as to obtain a regression center coordinate. In a practical application, the regression calculation can be implemented by averaging a sum of the X-axis coordinates of the measurement coordinates to obtain an X-axis coordinate of the regression center coordinate, and can be implemented by averaging a sum of the Y-axis coordinates of the measurement coordinates to obtain a Y-axis coordinate of the regression center coordinate.

The average calculating step S3 is performed by calculating the plurality of the measurement coordinates and the regression center coordinate to obtain the X-axis offset and the Y-axis offset of the autonomous mobile vehicle A. The regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

It should be noted that, in order to mark each calculated X-axis distance $\Delta x$ and Y-axis distance $\Delta y$ to have values for reference, when each time the distance calculating step S1 is performed, a reference spot image of the same reference spot corresponding to a reference pattern in the to-be-analyzed image 33 with the light spot image 332 is calculated to obtain the X-axis distance $\Delta x$ and the Y-axis distance $\Delta y$. Therefore, after each performing of the distance calculating step S1, the X-axis distance $\Delta x$ and the Y-axis distance $\Delta y$ are ensured to be calculated with value for reference.

The predetermined positions in the controlling steps S11 can be the same or different from each other according to practical requirements. If the predetermined positions in the controlling steps S11 are different from each other, each of the predetermined positions needs to be arranged with the light beam device 2 or the image capture device 3.

The predetermined number of times is greater than or equal to two times, but the present disclosure is not limited thereto. In one embodiment of the present disclosure (e.g., the autonomous mobile vehicle A is an AMR), when the autonomous mobile vehicle A is moved to the same predetermined position in each movement, the autonomous mobile vehicle A may be parked at slightly different angles or positions due to various factors. Accordingly, the X-axis offset and the Y-axis offset can be obtained by performing the regression center calculating step S2 and the average calculating step S3 after the distance calculating steps S1 is repeatedly performed for the predetermined number of times, so that the X-axis offset and the Y-axis offset can be close to a true offset of the autonomous mobile vehicle A in the X-axis direction and the Y-axis direction when the autonomous mobile vehicle A is moved to the predetermined position in each movement. In one embodiment of the present disclosure, the accuracy measurement method of the autonomous mobile vehicle is provided for a general detection standard of AMR (e.g., AMRA-201 Mobile Robot— General Requirements and Testing Methods), the predetermined number of times is greater than or equal to 30 times, such that the X-axis offset and the Y-axis offset can be ensured to represent the true offset of the AMR in the X-axis direction and the Y-axis direction in a sufficiently accurate manner.

In a practical application, the light beam device 2 can be a laser device that is configured to emit at least one laser beam, but the present disclosure is not limited thereto. As long as the light beam device 2 is capable of forming the light spot image 332 on the marker 1 that is able to be recognized by general image recognition software (e.g., an image recognition software using the OpenCV library), the light beam device 2 can be one that emits any kind of light beams.

In the present embodiment, the light beam device 2 is disposed on the periphery of the predetermined position, and the marker 1 is disposed on the autonomous mobile vehicle A, but the present disclosure is not limited thereto. In other embodiments of the present disclosure, the light beam device 2 can be disposed on the autonomous mobile vehicle A, the marker 1 can be disposed on the periphery of the predetermined position, and under the condition that the image capture device 3 can correctly capture an image of the marker 1 (e.g., the image of the marker 1 includes the AprilTag 4 and the spot that is formed on the maker 1 by the light beam device 2), the image capture device 3 can be disposed on the autonomous mobile vehicle A or the periphery of the predetermined position.

In one embodiment of the present disclosure (e.g., the light beam device 2 is disposed on the autonomous mobile vehicle A, and the marker 1 is disposed on the periphery of the predetermined position), the image capture device 3 can be an electronic device built-in the autonomous mobile vehicle A; in other words, if an image capture device built-in the autonomous mobile vehicle A can capture the AprilTag 4 on the marker 1 disposed on the periphery of the predetermined position and the light spot 12 that is formed on the marker 1 by the light beam device 2, the autonomous mobile vehicle A does not need to be additionally assembled with other image capture devices.

The marker 1 can be a component independent from the autonomous mobile vehicle A, or can be detachably disposed on the autonomous mobile vehicle A. For example, the marker 1 can be a sticker, one side of the marker 1 can be printed with the AprilTag 4, and a color of the AprilTag 4 on the marker 1 includes black and white or includes gray and white, another side of the marker 1 is adhered to a releasing film, so that after the releasing film is removed by a user, the marker 1 can be adhered to the upper surface of the autonomous mobile vehicle A through an adhesive layer of the marker 1. The adhesive layer can be made of any kind of adhesive, and is preferably a re-attachable adhesive. The marker 1 is not limited to the sticker. In other embodiments of the present disclosure, one side of the marker 1 can be disposed with a magnet layer, and the marker 1 can be magnetically attached to the upper surface of the autonomous mobile vehicle A through the magnet layer. It should be noted that, in the figures of the present embodiment, the AprilTag 4 is an AprilTag of TAG36H11. In practice, any family of the AprilTags can be selected according to practical requirements, such as TAG16H5, TAG25H7, TAG25H9, TAG36H10, etc.

In practice, in the image analyzing step S14, the calculating device A2 can be configured to operate a label identification program, the label identification program can be written in a programming language such as Python. In the label identification program, for example, the to-be-analyzed image can be read/inputted, and a relevant function corresponding to the AprilTag library in the OpenCV can be called to identify the AprilTag in the to-be-analyzed image. If the AprilTag in the to-be analyzed image is successfully identified, the label identification program can obtain the four corner coordinates (and the label central point coordinate) corresponding to the AprilTag. The AprilTag library and the functions thereof are prior art, the present embodiment is not described herein for the sake of brevity.

In the image analyzing step S14, after the label identification program is performed, an image processing program is continually performed to execute at least one image processing procedure for the to-be-analyzed image so as to obtain a central point coordinate corresponding to the light spot image. In the image processing procedure, the to-be-analyzed image is processed in the binarization manner through the color of the light spot on the marker to generate a first processed image, the first processed image is sequentially processed in the erosion and dilation manner and the edge detection manner to recognize an edge of the light spot of the first processed image, and the light spot center coordinate of the light spot image of the first processed image can be obtained by using the findContours( ) function in the OpenCV library. Naturally, the to-be-analyzed image is analyzed in image to obtain the light spot center coordinate corresponding to the light spot, but the present disclosure is not limited thereto.

In addition, after the calculating device A2 executes the label identification program and the image processing program so as to obtain the four corner coordinates and the light spot center point coordinate, the calculating device A2 can continue to execute a calculating program to calculate the reference point coordinate and the light spot center coordinate so as to obtain the X-axis distance and Y-axis distance in the X-axis direction and Y-axis direction respectively by using one of the corner coordinates (or the label central point coordinate) as the reference point.

It is worth mentioning that, in the light beam emitting step S12, the light spot is not overlapped with the AprilTag 4 on the marker 1. Accordingly, the following issues in the image analyzing step S14 can be effectively avoided, and include the label identification program that cannot correctly identify the AprilTag, or the image processing program that cannot correctly analyze the light spot center point coordinate corresponding to the light spot image. Naturally, in the embodiment where the light spot is overlapped with the AprilTag 4 on the marker 1, a brightness of the light spot can also be adjusted to ensure that in the image analyzing step S14, the four corner coordinates and the light spot center coordinate can be effectively analyzed.

Figure 5:
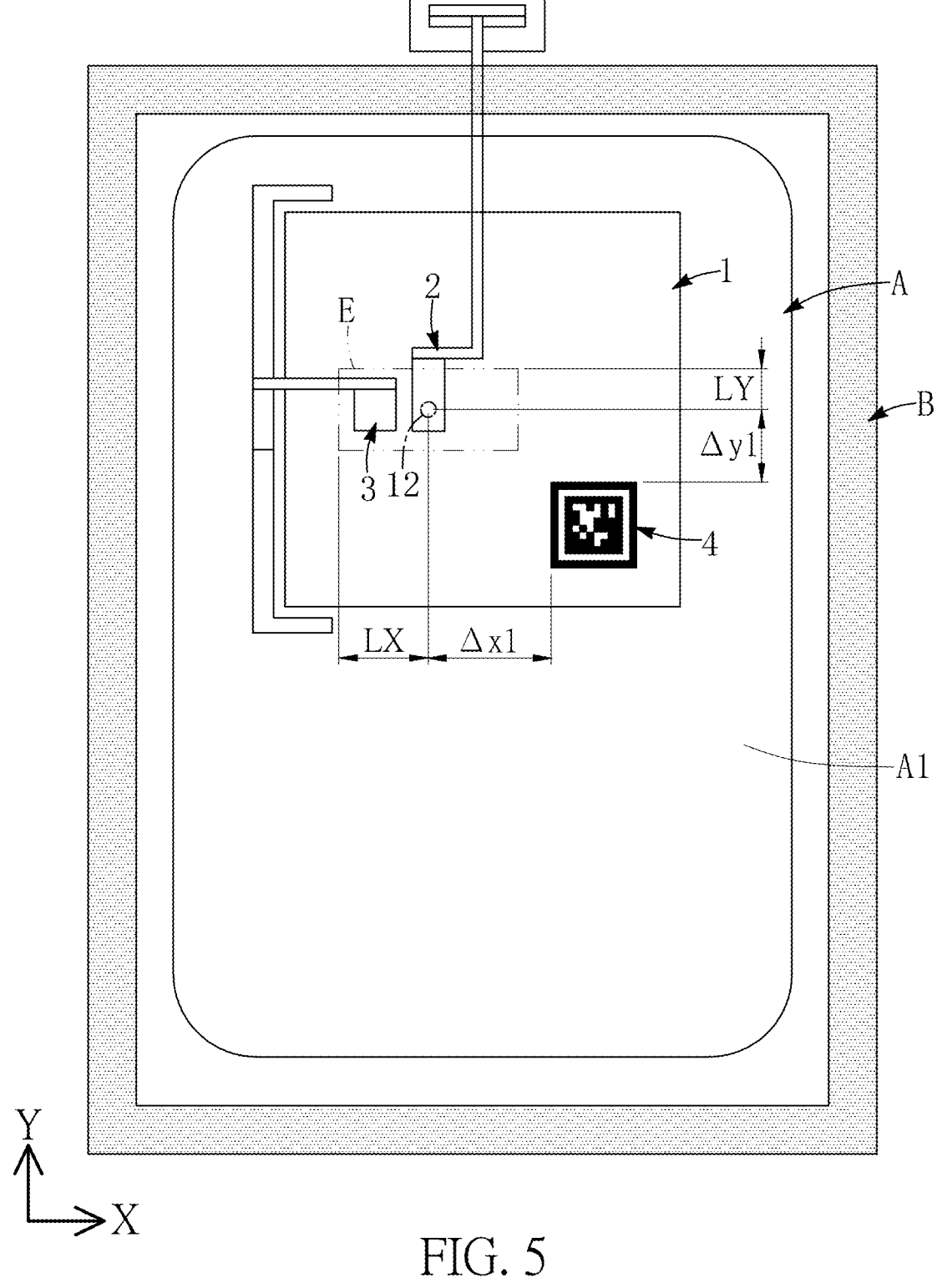
FIG. 5 is a top view of the autonomous mobile vehicle of the present disclosure when the autonomous mobile vehicle moves to a predetermined position in an X-axis direction and a Y-axis direction without deviation.

As shown in FIG. 2 and FIG. 5, the FIG. 5 is a top view of the autonomous mobile vehicle of the present disclosure when the autonomous mobile vehicle moves to the predetermined position in the X-axis direction and the Y-axis direction without deviation. A maximum acceptable X-axis offset and a maximum acceptable Y-axis offset of the autonomous mobile vehicle A in the X-axis direction and the Y-axis direction are respectively defined as an X-axis deviation limit value and a Y-axis deviation limit value, and when the autonomous mobile vehicle A moves to the predetermined position in the X-axis direction and the Y-axis direction without deviation (as shown in FIG. 5), in the light beam emitting step S12, a shortest straight-line distance $\Delta x1$ between the AprilTag 4 on the marker 1 and the light spot 12 in the X-axis direction is greater than the X-axis deviation limit value LX, and a shortest straight-line distance $\Delta y1$ between the AprilTag 4 on the marker 1 and the light spot 12 in the Y-axis direction is greater than the Y-axis deviation limit value LY.

In other words, when determining a position of the AprilTag 4 disposed on the marker 1, the light beam device 2 can be first placed around a predetermined position, the autonomous mobile vehicle A disposed on the marker 1 is placed at the predetermined position, and the autonomous mobile vehicle A is placed at the predetermined position in the X-axis direction and the Y-axis direction without deviation. After that, the light beam device 2 is used to form the light spot 12 on the marker 1, and then a clearance area E is drawn on the marker 1 by using the light spot 12 in conjunction with the X-axis deviation limit value LX and the Y-axis deviation limit value LY. Finally, the AprilTag 4 is disposed on an area outside of the clearance area E. For example, if the X-axis deviation limit value LX and the Y-axis deviation limit value LY are ±3 cm and ±5 cm, respectively, the clearance area E can be an area of 6 cm*10 cm, the light spot is located in a central position of clearance area E, and the AprilTag 4 is located on the area outside of the clearance area E. This design can ensure that when the light beam emitting step S12 is subsequently performed, the light spot 12 cannot be formed on the AprilTag 4, that is, the light spot 12 is not overlapped with AprilTag 4.

In summary, the accuracy measurement method, the calculating device capable of performing the accuracy measurement method, and the autonomous mobile vehicle having the calculating device in the present disclosure can each be provided to obtain the X-axis offset and the Y-axis offset of the autonomous mobile vehicle when moving to the predetermined position, and the relevant personnel can confirm whether the X-axis offset and the Y-axis offset of the autonomous mobile vehicle falls within the accuracy tolerance range claimed by the manufacturer. In addition, after the relevant personnel obtains the X-axis offset and the Y-axis offset of the autonomous mobile vehicle, the autonomous mobile vehicle can be used at a suitable location with a collision issue due to an offset of the autonomous mobile vehicle being significantly reduced.

For example, if the autonomous mobile vehicle A is moved to the predetermined position as shown in FIG. 3, the calculating device A2 can be operated to obtain that the X-axis offset is −5 cm and the Y-axis is +5 cm. However, an accuracy tolerance of the autonomous mobile vehicle A in any one of the X-axis direction and the Y-axis direction is ±1 cm as described in the manuals. Accordingly, the user can know that the autonomous mobile vehicle A does not meet the accuracy tolerance range (e.g., ±1 cm) claimed by the manufacturer.

In the related art, there is no tool, apparatus, or method that can be used to detect an accuracy (e.g., the X-axis offset and the Y-axis offset) of the autonomous mobile vehicle, so that the relevant personnel has no other option but to take the word of the manufacturer. Only when a collision of the autonomous mobile vehicle occurs at the location where it is deployed (e.g., factory premises) can users become aware that there may be a discrepancy between the actual accuracy of the autonomous mobile vehicle, and the accuracy that is advertised by the manufacturer. This can lead to all kinds of inconveniences for relevant personnel; inconveniences which the present disclosure aims to address.

As shown in FIG. 1, in one embodiment of the present disclosure, the calculating device A2 can be electrically coupled to an external electronic device C (e.g., in a wireless connection) for obtaining the true length and the predetermined number of times from the external electronic device C or receiving an amended information transmitted from the external electronic device C to amend at least one of the true length and the predetermined number of times stored therein. For example, the external electronic device C can be a smartphone, a tablet computer, a notebook computer, a desktop computer, or a remote server, and when the external electronic device C performs a predetermined application (APP) and is electrically coupled to the calculating device A2, the external electronic device C can emit signals relating to the true length, the predetermined number of times, and the amended information, to the calculating device A2.

Preferably, after the average calculating step S3, the calculating device A2 further performs an outputting step by outputting the X-axis offset and the Y-axis offset to the external electronic device C. In other words, after the calculating device A2 performs the accuracy measurement method of the present disclosure, the calculating device A2 can transmit the X-axis offset and the Y-axis offset to the external electronic device C, so that the relevant personnel can obtain the X-axis offset and the Y-axis offset by observing the external electronic device C.

As shown in FIG. 1, in a practical application, the calculating device A2 is electrically connected to the processing device A3; for example, the calculating device A2 can emit a query signal to the processing device A3 for learning whether the autonomous mobile vehicle A is moved to the predetermined position; or, when the autonomous mobile vehicle A is moved to the predetermined position, the processing device A3 can proactively send a relevant signal to the calculating device A2, informing the calculating device A2 that the autonomous mobile vehicle A is moved to the predetermined position, so that subsequent steps (e.g., the light-beam emitting step) can be performed.

In one embodiment of the present disclosure (e.g., the calculating device A2 is independent from the autonomous mobile vehicle A), when the autonomous mobile vehicle A is automatically moved to the predetermined position, the relevant personnel can trigger the calculating device A2, the light beam device 2, and the image capture device 3 to be operated for performing the accuracy measurement method of the autonomous mobile vehicle of the present disclosure.

In summary, the accuracy measurement method, the calculating device capable of performing the accuracy measurement method, and the autonomous mobile vehicle having the calculating device in the present disclosure can each be provided to allow the relevant personnel to clearly obtain the X-axis offset and the Y-axis offset of the autonomous mobile vehicle when the autonomous mobile vehicle is moved to the predetermined position, so that an operating relevant personnel can better plan the movement range of the autonomous mobile vehicle at the location (e.g., the factory premises), which can significantly reduce the probability of collision when the autonomous mobile vehicle moves in the area.

In addition, the accuracy measurement method, the calculating device capable of performing the accuracy measurement method, and the autonomous mobile vehicle having the calculating device in the present disclosure can each be provided to assist the relevant personnel to better adjust the related software and hardware of the autonomous mobile vehicle, so that the autonomous mobile vehicle can be moved to the predetermined position more accurately. In the related art, during the research and development of the software and hardware of the autonomous mobile vehicle, the relevant personnel is only able to manually determine whether the autonomous mobile vehicle has correctly moved to the predetermined position, which can cause inconveniences to the relevant personnel.

As shown in FIG. 1, it is worth mentioning that, in one embodiment of the autonomous mobile vehicle A of the present disclosure, after the calculating device A2 is operated to implement the accuracy measurement method of the autonomous mobile vehicle A, the X-axis offset and the Y-axis offset are respectively stored as an X-axis calibration amount and a Y-axis calibration amount in a relevant storage device (e.g., any kind of memory) of the autonomous mobile vehicle A. After the X-axis calibration amount and the Y-axis calibration amount are stored in the calculating device A2, and when the calculating device A2 receives a movement information that is transmitted by an external electronic device C, the calculating device A2 is operated to control the autonomous mobile vehicle A to move to an assigned position corresponding to the movement information according to the movement information, the X-axis calibration amount, and the Y-axis calibration amount.

In practice, the calculating device A2 is switchable between a movement positioning mode and a calibration mode. When the calculating device A2 is executed in the movement positioning mode, the calculating device A2 is operated to control the autonomous mobile vehicle A to move to the predetermined position according to the movement information, the X-axis calibration amount, and the Y-axis calibration amount, and to control the image capture device 3 to capture the AprilTag 4 located around the predetermined position so as to obtain an identification data (e.g., an ID of the AprilTag 4). When the calculating device A2 determines that the identification data obtained after the autonomous mobile vehicle A moved to the predetermined position is the same as a present identification data (e.g., the ID of the AprilTag 4) included in the movement information, the calculating device A2 determines that the autonomous mobile vehicle A has moved to the assigned position.

For example, the X-axis calibration amount and the Y-axis calibration amount that are stored in the calculating device A2 are +1.5 cm and −1.2 cm, respectively, and the movement information that is received by the calculating device A2 includes a coordinate of the assigned position and the ID of the AprilTag 4 that is disposed around the assigned position. The coordinate of the assigned position and the ID of the AprilTag 4 that are disposed around the assigned position are (10, 20) and 0, respectively. When the calculating device A2 controls the autonomous mobile vehicle A to move to the assigned position according to the movement information, the calculating device A2 can actually control the autonomous mobile vehicle A to move to a coordinate of (11.5, 18.8), and after the calculating device A2 controls the autonomous mobile vehicle A to move to a coordinate of (11.5, 18.8), the calculating device A2 controls the image capture device to capture the AprilTag 4 that is disposed around the assigned position. The calculating device A2 determines whether the ID corresponding to the AprilTag 4 is 0. If the ID is 0, the calculating device A2 determines that the autonomous mobile vehicle A has moved to the assigned position corresponding to the movement information.

It should be noted that, in the above-mentioned application method, the image capture device is used to capture the image of the AprilTag, and the ID corresponding to the AprilTag is analyzed to determine whether the autonomous mobile vehicle has moved to the assigned location, which is a common application method of conventional the AprilTag. This application method is obviously different from the application method of the AprilTag in the above-mentioned method for measuring the accuracy of the autonomous mobile vehicle of the present disclosure. That is to say, in the conventional technology related to the movement of the autonomous mobile vehicle, only the ID of the AprilTag (i.e., the identification data) is used to determine whether the autonomous mobile vehicle has reached the assigned position. The corner coordinates in the AprilTag are not used to calculate the offset of the autonomous mobile vehicle.

In addition, the accuracy measurement method of the autonomous mobile vehicle of the present disclosure is implemented by using the AprilTag in conjunction with the light beam device to obtain the X-axis offset and the Y-axis offset of the autonomous mobile vehicle in the X-axis direction and the Y-axis direction. In other words, the accuracy measurement method of the autonomous mobile vehicle of the present disclosure is not simply to use the AprilTag to obtain the X-axis offset and the Y-axis offset. Therefore, even if a person having ordinary skill in the art refers to a related technical content of the prior art regarding the use of the AprilTag to confirm the positioning of the autonomous mobile vehicle, they cannot easily think of the accuracy measurement method of the present disclosure.

In one embodiment of the present disclosure, when the calculating device A2 receives the movement information, the calculating device A2 first determines whether the X-axis calibration amount and the Y-axis calibration amount are stored in the autonomous mobile vehicle. If the calculating device A2 determines that the X-axis calibration amount and the Y-axis calibration amount are not stored in the autonomous mobile vehicle A, the calculating device A2 is configured to send out a calibration warning information. In practice, for example, the calculating device A2 can transmit the calibration warning information to the external electronic device C through various wireless communication manners, and the relevant personnel can view relevant prompt text such as "the autonomous mobile vehicle number 00123, which has not been calibrated yet, please confirm whether to perform calibration operations first" through the external electronic device C. When the relevant person knows that the autonomous mobile vehicle A has not been calibrated through the external electronic device C, the relevant person can transmit a calibration requesting information to the calculating device A2 through the external electronic device C. After the calculating device A2 receives the calibration requesting information, the calculating device A2 is operated to perform the accuracy measurement method of the autonomous mobile vehicle, and to enable the X-axis offset and the Y-axis offset to be respectively stored as the X-axis calibration amount and the Y-axis calibration amount of the autonomous mobile vehicle.

More specifically, before the autonomous mobile vehicle A leaves a factory, the calculating device or the processing device of the autonomous mobile vehicle A can first execute the accuracy measurement method of the autonomous mobile vehicle to confirm that the X-axis offset and Y-axis offset of the autonomous mobile vehicle meet the factory requirements. When the autonomous mobile vehicle A leaves the factory, the X-axis calibration amount and the Y-axis calibration amount cannot be stored in the autonomous mobile vehicle A, or any one of the X-axis calibration amount and the Y-axis calibration amount can be stored as 0. When the autonomous mobile vehicle A is purchased by the relevant personnel and is started to move to the predetermined position in the factory for the first time, since the X-axis calibration amount and the Y-axis calibration amount are not be stored in the autonomous mobile vehicle A or are stored as 0, the relevant personnel can view the calibration warning information on the external electronic device C, and the relevant personnel can use the external electronic device C to send the calibration requesting information that is used to enable the calculating device to automatically execute the accuracy measurement method of the autonomous mobile vehicle, thereby completing the calibration operation of the autonomous mobile vehicle A at the purchaser's site.

In other words, although the autonomous mobile vehicle A has been calibrated for the offset in the X-axis direction and the Y-axis direction before leaving the factory, after the autonomous mobile vehicle A is purchased by the relevant personnel, the autonomous mobile vehicle A still encounters issues of offset in either the X-axis direction or the Y-axis direction due to various factors (e.g., differences in ground material of venue). Therefore, in one of the embodiments of the present disclosure, aforementioned, the calibration operation can be performed again (i.e., the calculating device or the processing device executes the accuracy measurement method of the autonomous mobile vehicle of the present disclosure), so that the X-axis calibration amount and the Y-axis calibration amount are stored in the autonomous mobile vehicle A.

Furthermore, before the autonomous mobile vehicle A leaves the factory, the calculating device or the processing device of the autonomous mobile vehicle A has already executed to implement the accuracy measurement method of the autonomous mobile vehicle, and the autonomous mobile vehicle A has been calibrated for the offset in the X-axis direction and Y-axis direction. Therefore, in different embodiments, after the relevant personnel purchases the autonomous mobile vehicle A, the calculating device can also directly control the autonomous mobile vehicle to move to the assigned position according to the movement information.

FIG. 6 is a flowchart of the accuracy measurement method of the autonomous mobile vehicle according to a second embodiment of the present disclosure. The difference between the present embodiment and the above embodiments is described as follows. The image analyzing step S14 includes following step.

A determination step S141 that is implemented to obtain the four corner coordinates corresponding to the AprilTag and to obtain four edge lengths corresponding to the AprilTag by using the four corner coordinates, and that is implemented to determine whether a difference among the four edge lengths exceeded a predetermined difference.

When the difference among the four edge lengths is not greater than the predetermined difference, a calculating step S142 is performed to calculate the reference point coordinate and the light spot center coordinate so as to obtain the X-axis distance in the X-axis direction and the Y-axis distance in the Y-axis direction.

When the difference among the four edge lengths is greater than the predetermined difference, an image calibrating step S14X is performed first, and then the calculating step S142 is performed, and the image calibrating step S14X is performed to calibrate the to-be-analyzed image so as to enable the difference among the four edge lengths to not exceed the predetermined difference. In practice, the image calibrating step S14X can use functions (e.g., warpPerspective( ) and getPerspectiveTransform( ) in OpenCV to achieve an effect of calibrating the to-be-analyzed image. Naturally, in practice, any method that can perform keystone calibration on the image can be used function.

More specifically, in the determination step S141, the difference among the four edge lengths is greater than the predetermined difference, the to-be-analyzed image can be trapezoidally deformed due to various factors. For this reason, if the to-be-analyzed image that is deformed is directly used for subsequent calculations, an error may occur. Therefore, in the difference among the four edge lengths is greater than the predetermined difference, the accuracy of the final calculated X-axis distance and Y-axis distance can be ensured by first performing the image calibrating step S14X and then performing the calculating step S142.

Figure 8:
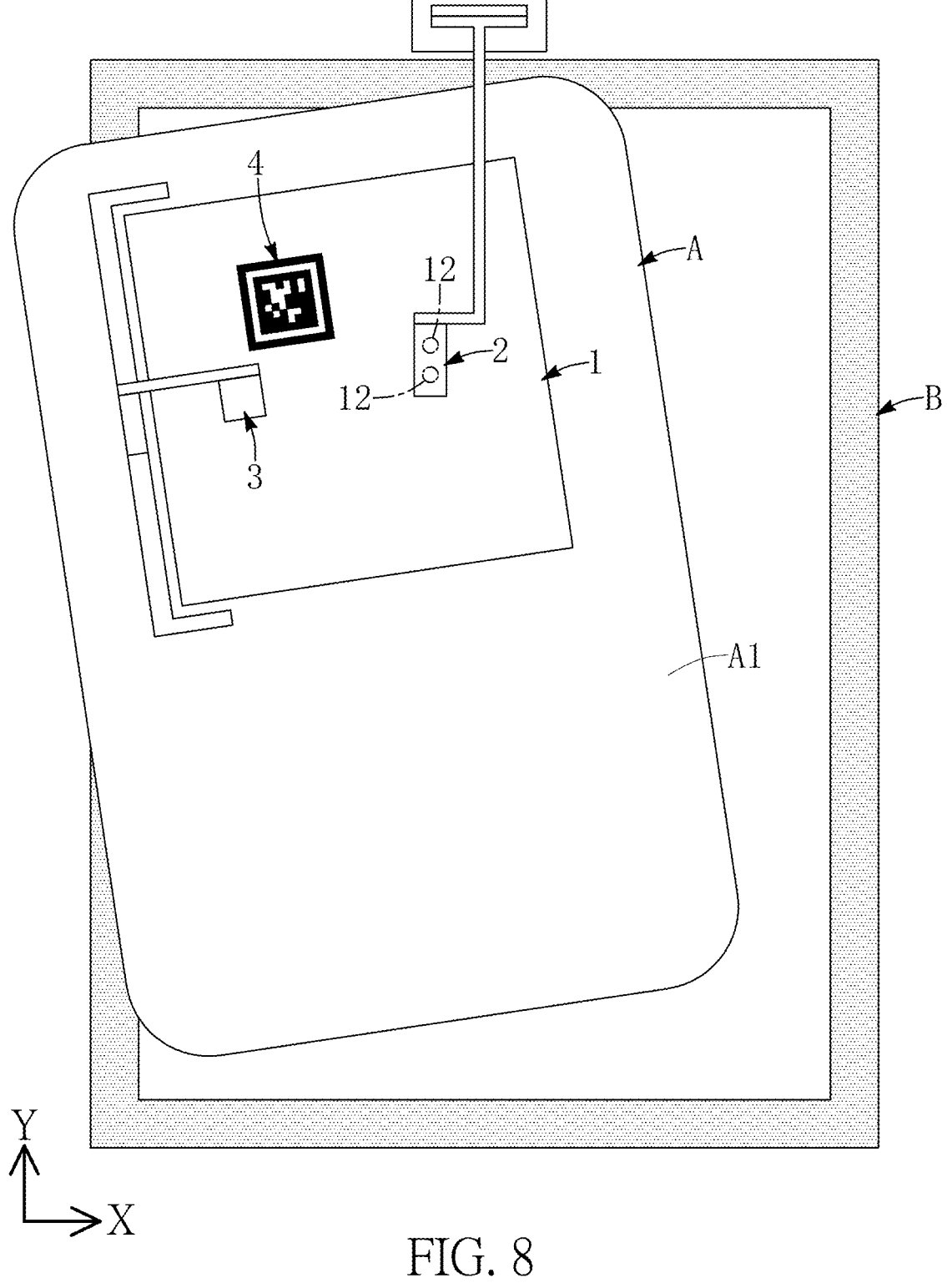
FIG. 8 is a top view of the autonomous mobile vehicle, a light beam device, and an image capture device according to the third embodiment of the present disclosure.
Figure 9:
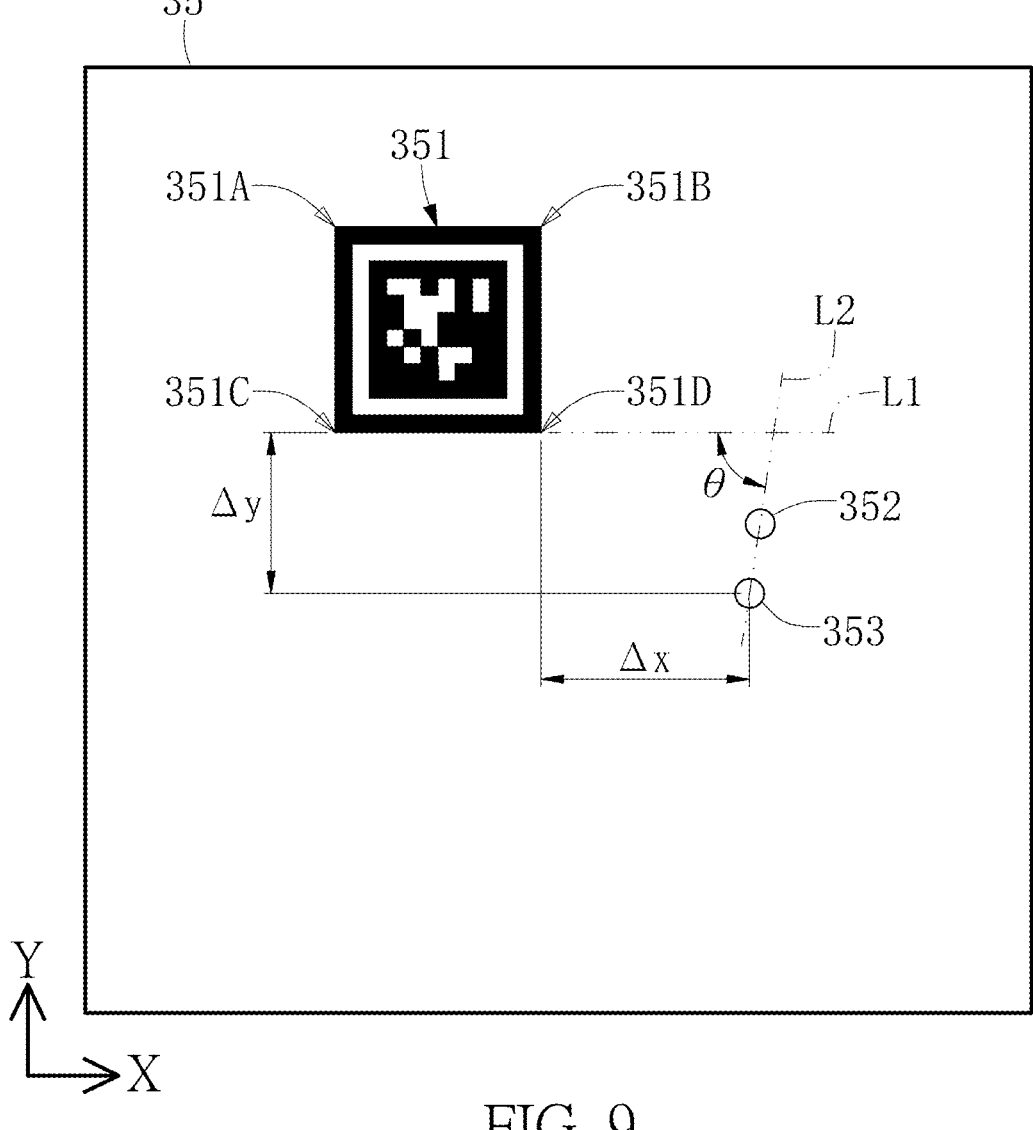
FIG. 9 is a schematic view showing the to-be-analyzed image of the accuracy measurement method according to the third embodiment of the present disclosure.

As shown in FIG. 7 to FIG. 9, FIG. 7 is a flowchart of the accuracy measurement method of the autonomous mobile vehicle according to a third embodiment of the present disclosure, FIG. 8 is a top view of the autonomous mobile vehicle, a light beam device, and an image capture device according to a third embodiment of the present disclosure, and FIG. 9 is a schematic view showing the to-be-analyzed image of the accuracy measurement method according to the third embodiment of the present disclosure.

The difference between a light beam emitting step S12A of the present embodiment and the light beam emitting step S12 of the above embodiments is described as follows. In the light beam emitting step S12A, the light beam device 2 is controlled to emit two of the light beams toward the marker 1 so as to form two light spots 12 on the marker 1, the two light spots 12 not overlapping with each other. The difference between an image analyzing step S14A of the present embodiment and the image analyzing step S14 of the above embodiments is described as follows. In the image analyzing step S14A, the to-be-analyzed image 35 is calculated to obtain a deflection angle θ.

The deflection angle θ is an included angle defined by a reference connecting line L1 of the label image 351 and a line L2 of the two light spot images 352, 353. The reference connecting line L1 is passed through the corner point 351D that is the reference point, and the reference connecting line L1 is further passed through the corner point 351C that is not the reference point. Naturally, in other embodiments of the present disclosure, the reference connecting line L1 can also be passed through the corner points 351A, 351B, or can be passed through the corner points 351A, 351C, or can be passed through the corner points 351B, 351D.

Furthermore, the difference between an average calculating step S3A of the present embodiment and the average calculating step S3 of the above embodiments is described as follows. In the average calculating step S3A, an average deflection angle is obtained by calculating a plurality of the deflection angles θ, and the average deflection angle is defined as an average of the deflection angles θ.

It should be noted that in each of the image analyzing steps S14A, the corner coordinate corresponding to the same one of the corner coordinates of the label image 351 or the label central point coordinate and the same one (e.g., the light spot image 353) of the two light spot images 352, 353 are calculated to obtain the X-axis distance Δx and the Y-axis distance Δy.

In summary, the accuracy measurement method of the autonomous mobile vehicle in the present disclosure can be used not only to obtain the X-axis offset and the Y-axis offset of the autonomous mobile vehicle by calculation, but also used to obtain the average deflection angle of the autonomous mobile vehicle by calculation.

In the process of inventing the present disclosure, an applicant has tried to use the light beam device to form the light spot on the marker, and use the image capture device to capture the light spot and the image of the reference point having color, thereby forming the to-be-analyzing image. Finally, the to-be-analyzed image is analyzed through relevant programs, and a center of the light spot images that is analyzed and a center of the reference point are calculated to obtain the offset of the autonomous mobile vehicle in the X-axis direction or the Y-axis direction. Although the method can also be calculated to obtain the offset of the autonomous mobile vehicle in the X-axis direction or the Y-axis direction, the applicant found that when performing image analysis, at least one of the light spot image and the reference point image on the to-be-analyzed image is often not corrected analyzed. If either the light spot image or the reference point image is not correctly analyzed, then the offset of the autonomous mobile vehicle in the X-axis direction or the Y-axis direction is not obtained.

The applicant has carefully studied the reasons for the above issues that when the image capture device captures the marker, the reference point is affected by a halo of the light spot, the reference point is affected by an ambient light, and the light spot is affected by the ambient light. An influence of other issues causes an outline of the reference point or an outline of the light spot in the to-be-analyzed image to be correctly analyzed.

In addition, the applicant also found that since in a process of the to-be-analyzed image, and the to-be-analyzed image can be pre-processed first, such as binarization processing of the to be analyzed image, etc. Therefore, if the reference point that has been colored is affected by laser light, after the to-be-analyzed image is binarized, and the issue may occur that the reference point that has been colored completely disappears in the to-be-analyzed image that is processed. If after the to-be-analyzed image is processed, the image corresponding to the reference point that has been colored of the to-be-analyzed image completely disappears, and in subsequent steps, the offset of the autonomous mobile vehicle in the X-axis direction or the Y-axis direction is completely impossible to be obtained.

In practice, the reference points on the marker are prone to have damage, contamination, etc. due to various factors. In the situation, the relevant program cannot be able to correctly analyze the reference points when analyzing the to-be-analyzed image. Eventually, it may happen that the offset of the autonomous mobile vehicle in the X-axis direction or the Y-axis direction cannot be calculated at all.

Conversely, the accuracy measurement method of the autonomous mobile vehicle of the present disclosure uses the light beam emitted by the AprilTag and the light beam device to calculate and obtain the X-axis offset and Y-axis offset of the autonomous mobile vehicle in the X-axis direction and the Y-axis direction. Therefore, the accuracy measurement method of the autonomous mobile vehicle of the present disclosure can greatly improve the issues caused by the above-mentioned the reference points that have been colored. Specifically speaking, the color of the AprilTag includes black and white or includes gray and white. Therefore, the accuracy measurement method of the autonomous mobile vehicle of the present disclosure only needs to ensure that the light spot image in the to-be-analyzed image can be analyzed to obtain the light spot center coordinate in the image analyzing step, and make sure the AprilTag can be read normally. The accuracy measurement method of the autonomous mobile vehicle of the present disclosure basically does not cause aforementioned the issues of the reference points and the light spots disappearing. Even if the problem of light spots disappearing occurs in the image analysis step of the accuracy measurement method of the autonomous mobile vehicle of the present disclosure, the relevant personnel can quickly solve the issue by changing the color of the light beam emitted by the light beam device.

Furthermore, in a preferred embodiment of the calculating device and the autonomous mobile vehicle of the present disclosure, the calculating device A2 is configured to control the light beam device 2 to emit the light beam having one of different wavelengths so as to form the light spot 12 of the color corresponding to the one of the wavelengths of the light beam on the marker 1. With this design, when the computing device A2 executes the accuracy measurement method of the autonomous mobile vehicle of the present disclosure, and the issue of the light spot disappearing occurs in the image analyzing step of the calculating device A2, the relevant personnel can use the relevant input device (e.g., a touch panel, a mouse, and a keyboard etc., connected to the external electronic device C, the relevant buttons provided on the autonomous mobile vehicle A, or the relevant buttons on the light beam device 2, etc.) to change the wavelength of the light beam emitted by the light beam device 2. Accordingly, the light beam device 2 forms the light beam of one of different colors on the marker 1. Naturally, in a better practice, the calculating device A2 can automatically control the light beam device to emit the light beam having one of different wavelengths after performing the image analyzing step and determining that the light spot image cannot be analyzed in the to-be-analyzed image.

It should be noted that, the AprilTag in the above description can be changed to an ArUco tag according to practical requirements. In the above-mentioned the accuracy measurement method of the autonomous mobile vehicle of the present disclosure, compared with using the ArUco tag, the use of the AprilTag has the following advantages: higher precision positioning, ability to adapt to more complex environments, support for a wider range of angular offsets, and get technical benefits from longer distance support. Conversely, the calculating resources required by using the AprilTag can be slightly higher than those required by using the ArUco tag. In addition, in terms of current program development resources, the support of the AprilTag's related program development resources is higher than the support of the ArUco tag's related program development resources.

It is worth mentioning that, whether the accuracy measurement method of the autonomous mobile vehicle of the present disclosure uses the AprilTag or the ArUco tag, it is far superior than using ordinary two-dimensional barcodes (e.g., QR code). Specifically, using of the AprilTag, the ArUco tag, and the QR code for positioning have the limits of positioning accuracy that can be respectively achieved in sub-millimeter level, millimeter level, and centimeter level. Therefore, the using of the AprilTag or the ArUco tag is obviously better than the using of QR code.

Any of the above embodiments, in practice, in order to obtain better measurement results, a length and a width of the AprilTag or the ArUco tag each are greater than or equal to 10 mm, and a total number of pixels included in a length of the label image and a total number of pixels included in a width of the label image each are at least five times of a total number of pixels included in a diameter of the light spot image. That is to say, the diameter of the light spot image is less than the length or the width of the label image, which can effectively improve an accuracy of a final measurement result. Naturally, in practice, the total number of pixels included in the label image and the total number of pixels included in the light spot image are determined according to a resolution of the image capture device and a magnification of the lens used during capture, but the present disclosure is not limited thereto. If the diameter of the light spot image is greater than or equal to the length or width of the label image, in the image analyzing step, the X-axis distance and the Y-axis distance cannot be calculated using the reference point and the center of the light spot image.

In summary, any one of the accuracy measurement method, the calculating device, and the autonomous mobile vehicle of the present disclosure can be more accurate and faster provided to measure the X-axis offset in the X-axis direction and the Y-axis offset in the Y-axis direction of the autonomous mobile vehicle through the distance calculating step, the regression center calculating step, and the average calculating step, etc., and in conjunction with an application of the AprilTag (or the ArUco tag) so that the relevant personnel can know the accuracy of the autonomous mobile vehicle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An accuracy measurement method configured to be performed through a calculating device to measure an X-axis offset and a Y-axis offset of an autonomous mobile vehicle respectively along an X-axis direction and a Y-axis direction, the accuracy measurement method comprising:

a distance calculating step that is repeatedly performed for a predetermined number of times greater than or equal to two times, wherein the distance calculating step includes:

a controlling step that is implemented to control the autonomous mobile vehicle to move to a predetermined position;

a light beam emitting step that is implemented to control a light beam device to emit at least one light beam toward a marker so as to form one or more light spot on the marker, wherein the marker has an AprilTag or an ArUco tag, wherein, in the light beam emitting step, the light spot is away from the AprilTag or the ArUco tag, and wherein the light beam device is disposed on the autonomous mobile vehicle and the marker is disposed on a periphery of the predetermined position, or the marker is disposed on the autonomous mobile vehicle and the light beam device is disposed on the periphery of the predetermined position;

an image capturing step that is implemented to control an image capture device to capture an image of the marker so as to form a to-be-analyzed image, wherein the to-be-analyzed image includes a label image corresponding to the AprilTag or the ArUco tag and a light spot image corresponding to the light spot;

an image analyzing step that is implemented to analyze the label image in the to-be-analyzed image so as to obtain four corner coordinates corresponding to the AprilTag or the ArUco tag, and to obtain an X-axis distance in the X-axis direction and a Y-axis distance in the Y-axis direction of a reference point coordinate of the label image, and a light spot center coordinate of the light spot image, wherein the reference point coordinate is one of the four corner coordinates or the reference point coordinate is a label central point coordinate of the label image that is calculated from the four corner coordinates;

a converting step that is implemented to convert the X-axis distance and the Y-axis distance into an X-axis true distance and a Y-axis true distance so as to generate a measurement coordinate by using a true length of one side of the AprilTag or the ArUco tag and a straight line distance calculated from two of the four corner coordinates on a same axis, wherein the measurement coordinate includes the X-axis true distance and the Y-axis true distance; and a regression center calculating step that is performed by using a regression calculation to calculate a plurality of the measurement coordinates so as to obtain a regression center coordinate; and an average calculating step that is performed by calculating the plurality of the measurement coordinates and the regression center coordinate to obtain the X-axis offset and the Y-axis offset of the autonomous mobile vehicle, wherein the regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

2. The accuracy measurement method according to claim 1, wherein a color of the AprilTag or the ArUco tag on the marker includes black and white or includes gray and white, and each of a length and a width of the AprilTag or the ArUco tag is greater than or equal to 10 mm.

3. The accuracy measurement method according to claim 2, wherein a total number of pixels included in a length of the label image and a total number of pixels included in a width of the label image each are at least five times of a total number of pixels included in a diameter of the light spot image.

4. The accuracy measurement method according to claim 2, wherein, in the light beam emitting step, the light spot is not overlapped with the AprilTag or the ArUco tag on the marker.

5. The accuracy measurement method according to claim 2, wherein a maximum acceptable X-axis offset and a maximum acceptable Y-axis offset of the autonomous mobile vehicle in the X-axis direction and the Y-axis direction are respectively defined as an X-axis deviation limit value and a Y-axis deviation limit value, and wherein, when the autonomous mobile vehicle moves to the predetermined position in the X-axis direction and the Y-axis direction without deviation, in the light beam emitting step, a shortest straight-line distance between the AprilTag or the ArUco tag on the marker and the light spot in the X-axis direction is greater than the X-axis deviation limit value, and a shortest straight-line distance between the AprilTag or the ArUco tag on the marker and the light spot in the Y-axis direction is greater than the Y-axis deviation.

6. The accuracy measurement method according to claim 1, wherein, in the light beam emitting step, the light beam device is controlled to emit two of the light beams toward the marker so as to form two of the light spots on the marker that are not overlapped with each other; in the image analyzing step, the to-be-analyzed image is calculated to obtain a deflection angle, and the deflection angle is an included angle defined by a reference connecting line of the label image and a line of the two light spot images; the reference connecting line is passed through a reference point and one of the corner coordinates that is not the reference point; and in the average calculating step, an average deflection angle is obtained by calculating a plurality of the deflection angles, and the average deflection angle is defined as an average of the deflection angles.

7. The accuracy measurement method according to claim 1, wherein the marker is a component independent from the autonomous mobile vehicle and is detachably disposed on the autonomous mobile vehicle; or, the marker is a part of the autonomous mobile vehicle.

8. The accuracy measurement method according to claim 1, wherein the image analyzing step includes:

a determination step that is implemented to obtain the four corner coordinates corresponding to the AprilTag or the ArUco tag and to obtain four edge lengths corresponding to the AprilTag or the ArUco tag by using the four corner coordinates, and that is implemented to determine whether a difference among the four edge lengths exceeds a predetermined difference;

wherein, when the difference among the four edge lengths is not greater than the predetermined difference, the calculating step is performed to calculate the reference point coordinate and the light spot center coordinate so as to obtain the X-axis distance in the X-axis direction and the Y-axis distance in the Y-axis direction;

wherein, when the difference among the four edge lengths is greater than the predetermined difference, an image calibrating step is performed first, and then the calculating step is performed; and wherein the image calibrating step is performed to calibrate the to-be-analyzed image so as to enable the difference among the four edge lengths to not exceed the predetermined difference.

9. A calculating device for being assembled to an autonomous mobile vehicle and for performing the accuracy measurement method according to claim 1, wherein the calculating device is configured to be electrically coupled to a processing device of the autonomous mobile vehicle, the processing device is configured to control the autonomous mobile vehicle to move to the predetermined position, the calculating device is configured to be electrically coupled to the image capture device for controlling a movement of the image capture device and receiving the to-be-analyzed image emitted from the image capture device.

10. The calculating device according to claim 9, wherein the calculating device is configured to be electrically coupled to an external electronic device for obtaining the true length and the predetermined number of times from the external electronic device or receiving an amended information transmitted from the external electronic device to amend at least one of the true length and the predetermined number of times stored therein.

11. The calculating device according to claim 9, wherein, after the average calculating step, the calculating device further performs an outputting step by outputting the X-axis offset and the Y-axis offset to an external electronic device.

12. The calculating device according to claim 9, wherein the calculating device is configured to control the light beam device to emit the at least one light beam having one of different wavelengths to form the light spot of a color corresponding to the one of the wavelengths of the light beam on the marker.

13. An autonomous mobile vehicle, comprising:

a processing device;

a calculating device configured to be assembled to the autonomous mobile vehicle and to perform an accuracy measurement method of the autonomous mobile vehicle, wherein the calculating device is configured to be electrically coupled to the processing device, the processing device is configured to control the autonomous mobile vehicle to move to a predetermined position, the calculating device is configured to be electrically coupled to an image capture device for controlling a movement of the image capture device and receiving a to-be-analyzed image emitted from the image capture device;

a detecting device configured to detect a surrounding environment of the autonomous mobile vehicle to generate a detection information, wherein the detecting device is configured to transmit the detection information to the processing device; and a driving device electrically connected to the processing device, wherein the processing device is configured to control the driving device to be operated according to the detection information, so that the autonomous mobile vehicle is moved to the predetermined position; wherein the accuracy measurement method is for being-performed to measure an X-axis offset and a Y-axis offset of the autonomous mobile vehicle respectively along an X-axis direction and a Y-axis direction, the accuracy measurement method comprising:

a distance calculating step that is repeatedly performed for a predetermined number of times greater than or equal to two times, wherein the distance calculating step includes:

a controlling step that is implemented to control the autonomous mobile vehicle to move to the predetermined position;

a light beam emitting step that is implemented to control a light beam device to emit at least one light beam toward a marker so as to form one or more light spot on the marker, wherein the marker has an AprilTag or an ArUco tag, wherein, in the light beam emitting step, the light spot is away from the AprilTag or the ArUco tag, and wherein the light beam device is disposed on the autonomous mobile vehicle and the marker is disposed on a periphery of the predetermined position, or the marker is disposed on the autonomous mobile vehicle and the light beam device is disposed on the periphery of the predetermined position;

an image capturing step that is implemented to control the image capture device to capture an image of the marker so as to form the to-be-analyzed image, wherein the to-be-analyzed image includes a label image corresponding to the AprilTag or the ArUco tag and a light spot image corresponding to the light spot;

an image analyzing step that is implemented to analyze the label image in the to-be-analyzed image so as to obtain four corner coordinates corresponding to the AprilTag or the ArUco tag, and to obtain an X-axis distance in the X-axis direction and a Y-axis distance in the Y-axis direction of a reference point coordinate of the label image, and a light spot center coordinate of the light spot image, wherein the reference point coordinate is one of the four corner coordinates or the reference point coordinate is a label central point coordinate of the label image that is calculated from the four corner coordinates;

a converting step that is implemented to convert the X-axis distance and the Y-axis distance into an X-axis true distance and a Y-axis true distance so as to generate a measurement coordinate by using a true length of one side of the AprilTag or the ArUco tag and a straight line distance calculated from two of the four corner coordinates on a same axis, wherein the measurement coordinate includes the X-axis true distance and the Y-axis true distance; and a regression center calculating step that is performed by using a regression calculation to calculate a plurality of the measurement coordinates so as to obtain a regression center coordinate; and an average calculating step that is performed by calculating the plurality of the measurement coordinates and the regression center coordinate to obtain the X-axis offset and the Y-axis offset of the autonomous mobile vehicle, wherein the regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

14. The autonomous mobile vehicle according to claim 13, wherein, after the calculating device is operated to implement the accuracy measurement method, the X-axis offset and the Y-axis offset are respectively stored as an X-axis calibration amount and a Y-axis calibration amount of the autonomous mobile vehicle, wherein, after the X-axis calibration amount and the Y-axis calibration amount are stored in the calculating device, and wherein, when the calculating device receives a movement information, the calculating device is operated to control the autonomous mobile vehicle to move to an assigned position corresponding to the movement information according to the movement information, the X-axis calibration amount, and the Y-axis calibration amount.

15. The autonomous mobile vehicle according to claim 14, wherein the calculating device is switchable between a movement positioning mode and a calibration mode, wherein, when the calculating device is executed the movement positioning mode, the calculating device is operated to control the autonomous mobile vehicle to move to the predetermined position according to the movement information, the X-axis calibration amount, and the Y-axis calibration amount, and to control the image capture device to capture the AprilTag or the ArUco tag located around the predetermined position so as to obtain an identification data, wherein, when the calculating device determines that the identification data obtained after the autonomous mobile vehicle moved to the predetermined position is same as a present identification data included in the movement information, the calculating device determines that the autonomous mobile vehicle has moved to the assigned position, and wherein, when the calculating device is in the calibration mode, the calculating device is operated to implement the accuracy measurement method.

16. The autonomous mobile vehicle according to claim 14, wherein, when the calculating device receives the movement information, the calculating device first determines whether the X-axis calibration amount and the Y-axis calibration amount are stored in the autonomous mobile vehicle, if the calculating device determines that the X-axis calibration amount and the Y-axis calibration amount are not stored in the autonomous mobile vehicle, the calculating device is configured to send out a calibration warning information, wherein, after the calculating device sends out the calibration warning information and the calculating device receives a calibration requesting information, the calculating device is operated to perform the accuracy measurement method of the autonomous mobile vehicle, and to enable the X-axis offset and the Y-axis offset to be respectively stored as the X-axis calibration amount and the Y-axis calibration amount of the autonomous mobile vehicle.

17. The autonomous mobile vehicle according to claim 14, wherein the calculating device is configured to control the light beam device to emit the least one light beam having one of different wavelengths so as to form the light spot of a color corresponding to the one of the wavelengths of the light beam on the marker.

* * * * *